United States Patent
Belgaied et al.

(10) Patent No.: US 7,248,582 B2
(45) Date of Patent: Jul. 24, 2007

(54) METHOD AND SYSTEM FOR LABELING DATA IN A COMMUNICATIONS SYSTEM

(75) Inventors: Kais Belgaied, San Jose, CA (US); Gary Winiger, Mountain View, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 1074 days.

(21) Appl. No.: 10/158,277

(22) Filed: May 29, 2002

(65) Prior Publication Data

US 2003/0156582 A1    Aug. 21, 2003

Related U.S. Application Data

(60) Provisional application No. 60/356,821, filed on Feb. 13, 2002.

(51) Int. Cl.
*H04L 12/28* (2006.01)
*H04L 12/56* (2006.01)
*H04J 3/24* (2006.01)
*G06F 15/16* (2006.01)

(52) U.S. Cl. .............. 370/392; 370/474; 709/227; 709/230

(58) Field of Classification Search .......... None
See application file for complete search history.

(56) References Cited

U.S. PATENT DOCUMENTS

| | | | |
|---|---|---|---|
| 6,760,309 B1 * | 7/2004 | Rochberger et al. | 370/235 |
| 7,023,825 B1 * | 4/2006 | Haumont et al. | 370/338 |
| 7,023,846 B1 * | 4/2006 | Andersson et al. | 370/389 |
| 7,032,111 B1 * | 4/2006 | Ruutu et al. | 713/160 |
| 7,061,919 B1 * | 6/2006 | Anschutz | 370/395.43 |
| 7,065,095 B2 * | 6/2006 | Coden | 370/404 |
| 7,068,645 B1 * | 6/2006 | Phadnis et al. | 370/352 |
| 2002/0023080 A1 * | 2/2002 | Uga et al. | 707/1 |
| 2002/0083190 A1 * | 6/2002 | Kamiya et al. | 709/236 |
| 2003/0110379 A1 * | 6/2003 | Ylonen et al. | 713/164 |

OTHER PUBLICATIONS

"Internet Protocol: DARPA Internet Program Protocol Specification"; Information Services Institute, University of Southern California; Sep. 1981.
"Internet Protocol, Version 6 (Ipv6) Specification"; Stephen E. Deering and Robert M. Hinden; Dec. 1998.

* cited by examiner

*Primary Examiner*—Chi Pham
*Assistant Examiner*—Ronald Abelson
(74) *Attorney, Agent, or Firm*—Martine Penilla & Gencarella, LLP (57) ABSTRACT

A method and system for labeling data in a networked environment. The method and system comprise determining if a label should be added to a portion of data having an associated first header. If so, a second header is constructed containing a label. The second header is indicated in a reference in the first header. The label contains at least one attribute of the data. The second header is attached to the first header. The portion of data is then transmitted, along with the headers. In one embodiment, the second header may contain credential information related to the data portion.

27 Claims, 9 Drawing Sheets

METHOD AND SYSTEM FOR LABELING DATA IN A COMMUNICATIONS SYSTEM

RELATED US PATENT APPLICATION

This Application is related to U.S. Provisional Application entitled, "GENERALIZED LABELED SECURITY OPTION FOR IPV6," Application No. 60/356,821, filed on Feb. 13, 2002. This provisional application is hereby incorporated by reference.

BACKGROUND OF THE INVENTION

1. Field of the Invention

The present invention relates to the field of inter-networked devices. Specifically, an embodiment of the present invention relates to a method and system of labeling data to transfer data attributes along with the data.

2. Background Art

Estimates of the worldwide damage caused by malware (e.g., viruses, trojan horses, etc.) exceed $1 trillion per year in wasted effort to repair problems, reconstruct damaged data, etc. Trusted operating systems take a proactive approach to the problem by providing strong security features and assurances in accordance with formally stated requirements. They provide a trusted computing base built from the ground up for the purpose of enforcing a security policy (e.g., the set of rules that determine who accesses what and how). The trustworthiness comes from the guarantee, to a certain level of assurance, that all accesses to objects by subjects from software running on the trusted computing base are controlled and cannot compromise the protection mechanisms of the trusted computing base.

Multilevel security is being increasingly considered outside the traditional governmental and military circles, as it has the potential to meet emerging information technology security needs, when combined with other technologies. In order to guarantee that information is protected to a certain level of assurance, multilevel secure operating systems enforce a set of mandatory access control (MAC) rules that can be evaluated according to predefined criteria.

In order to enforce those access controls across a network, routing needs to be controlled so as to select specific network links in accordance with the security policy. Also, hosts need to retrieve the security attributes of data coming from the network and to communicate those of their own processes to remote hosts.

Information in a Multilevel-Secure Operating System, such as Trusted Solaris™, is assigned a label. The label contains attributes used to enforce the access controls required by a security policy. However, the label may be used for purposes other than security. The label of a process (e.g., program) may represent the credentials (e.g., owner, clearance, and privileges) or other attributes of that process. The label of an object (e.g., file, device, etc.) may represent the sensitivity (e.g., confidential, secret, public, engineering use only, etc.), the integrity, or other attributes of the data.

Implicit labeling is one way of labeling information. A conventional implicit labeling scheme is dedicating an IPsec (Internet Protocol Security) security association for each sensitivity level. However, implicit labeling has numerous shortcomings. First, scalability is limited when using implicit labeling. Implicitly binding security attributes to a security association may be sufficient when the set of values (e.g., sensitivity levels) is small. However, some attributes have a multitude of sensitivity levels. Thus, there needs to be a separate security association for each combination.

Another shortcoming of implicit labeling is the cost of establishing the security establishment. For example, an IPsec security association may be able to scale down to selectively protect a single socket (one connection/liaison). However, due to the cost of establishing the security association (including the key exchange), it is more efficient to aggregate the flows by broader selectors, such as host or subnet addresses or transport level port numbers.

A further shortcoming of implicit labeling is the inherent difficulty of using the implicit information to route data packets. For example, a router will not necessarily be a member of the security association. Unless the router is a member, it will not know the security attributes of the packets and hence is unable to route based on the attributes.

Explicit labeling is another way of labeling information. One conventional method using explicit labeling is an Internet Protocol Version 4 (IPv4) Security Option. However, this method was designed for only a small number of possible labels that are generally not well suited for commercial applications. Furthermore, emerging standards are making IPv4 antiquated.

Therefore, a problem with conventional methods of labeling information is scalability. Another problem with conventional methods is efficiency. Still another problem with conventional methods is not being able to use the labeling information to route data. A further problem is that some methods lack commercial applicability and are becoming antiquated.

SUMMARY OF THE INVENTION

The present invention provides a method for labeling information in a networked environment. Embodiments of the present invention provide a scalable solution. Embodiments of the present invention also provide an efficient solution. Embodiments of the present invention provide a solution that may be used to route data. Embodiments are suitable for commercial applications. The present invention provides these advantages and others not specifically mentioned above but described in the sections to follow.

A method and system for labeling data in a networked environment is disclosed. The method and system comprise determining if a label should be added to a portion of data having an associated first header. If so, a second header is constructed containing a label. The second header is indicated in a reference in the first header. The label contains at least one attribute of the data. The second header is attached to the first header. The portion of data is then transmitted, along with the headers. In one embodiment, the second header may contain credential information related to the data portion.

More specifically, an embodiment of the present invention is directed to: a) determining if a label is to be added to a portion of data having an associated first header; b) constructing a second header comprising the label, wherein the label comprises at least one attribute of the data; c) attaching the second header to the portion of data; and d) transmitting the portion of data along with the first and the second headers.

DETAILED DESCRIPTION OF THE INVENTION

In the following detailed description of the present invention a method for labeling data, numerous specific details are set forth in order to provide a thorough understanding of the present invention. However, it will be recognized by one skilled in the art that the present invention may be practiced without these specific details or with equivalents thereof. In other instances, well-known methods, procedures, components, and circuits have not been described in detail as not to unnecessarily obscure aspects of the present invention.

Notation and Nomenclature

Figure 3:
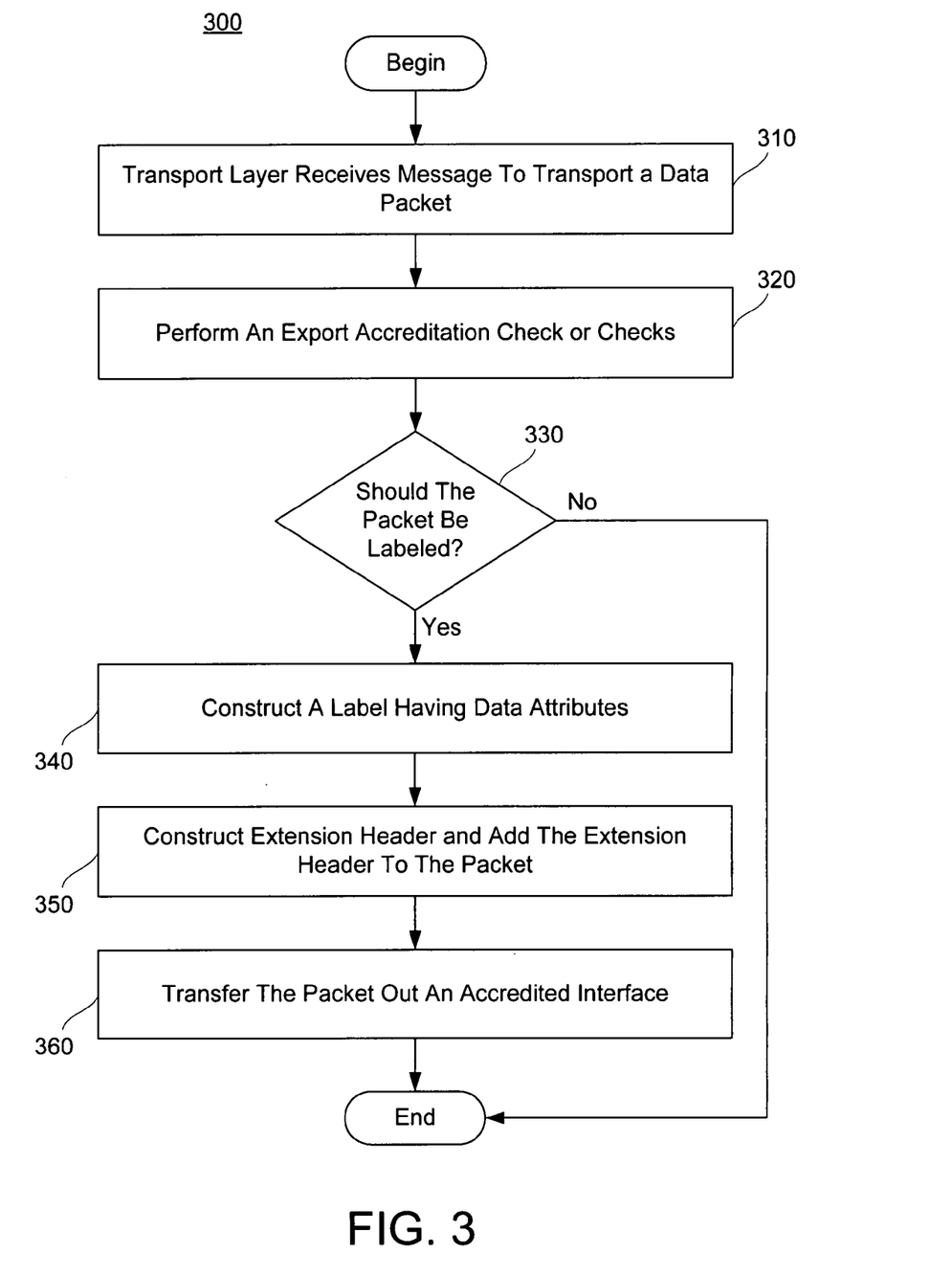
FIG. 3 is a flowchart illustrating steps of a computer process of labeling data, according to embodiments of the present invention.
Figure 6:
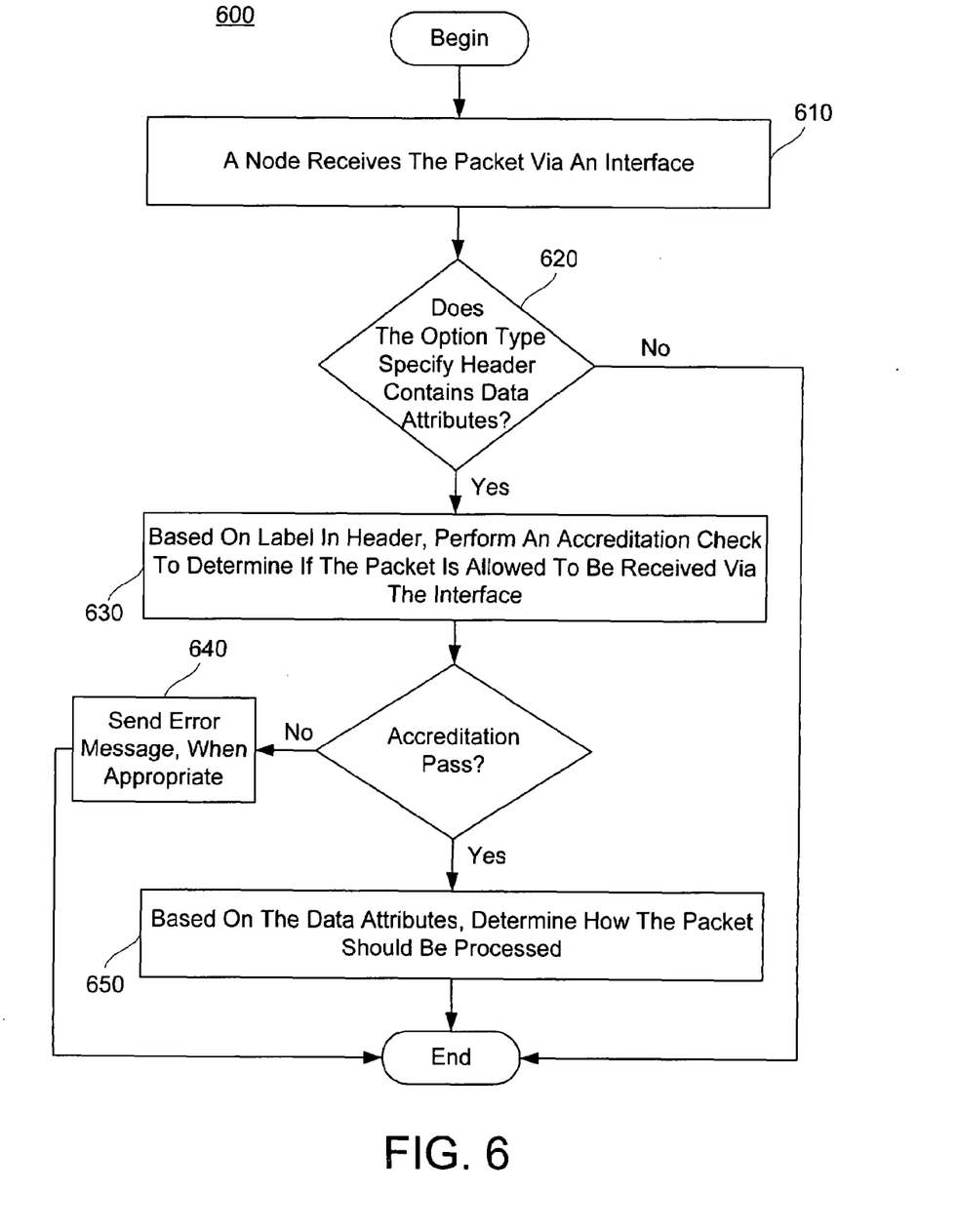
FIG. 6 is a flowchart illustrating steps of a computer process of processing packets based on attributes with which the data is labeled, according to embodiments of the present invention.
Figure 8:
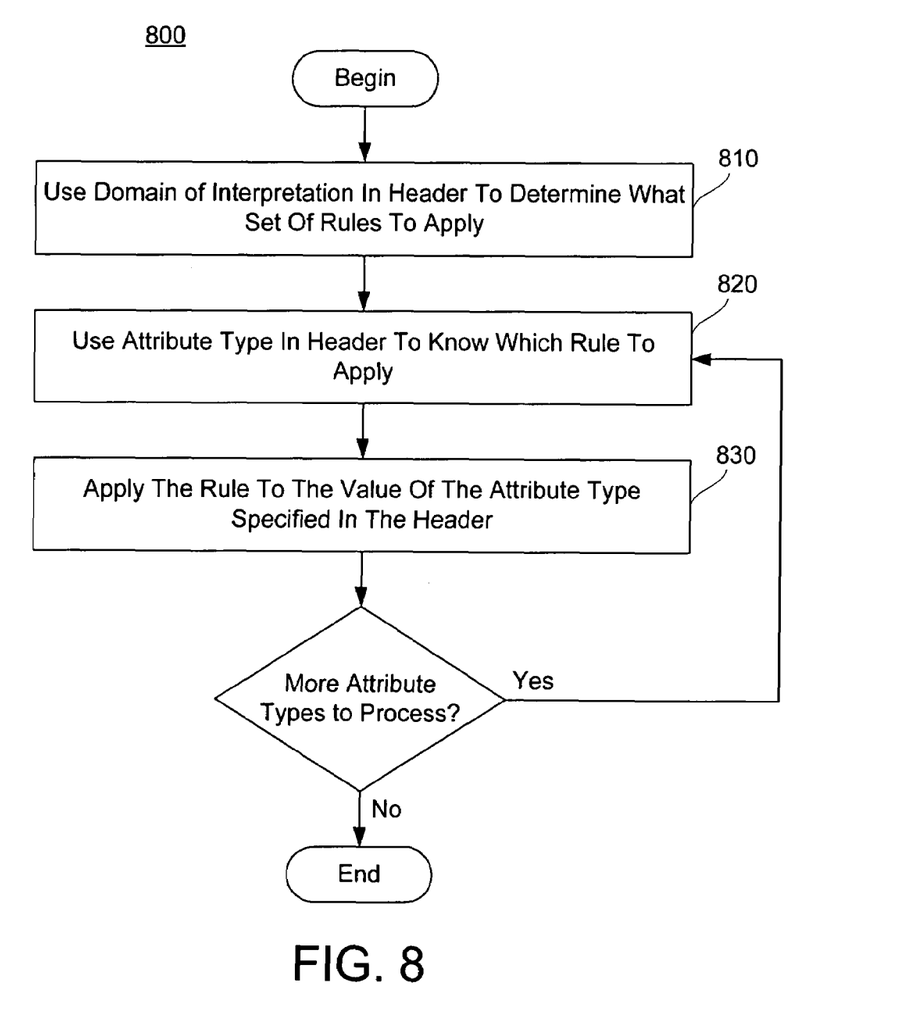
FIG. 8 is a flowchart illustrating steps of a process of using data in a header to process a packet, according to embodiments of the present invention.

Some portions of the detailed descriptions which follow are presented in terms of procedures, steps, logic blocks, processing, and other symbolic representations of operations on data bits that can be performed on computer memory (e.g., processes 300, 600, and 800). These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "indexing" or "processing" or "computing" or "translating" or "calculating" or "determining" or "scrolling" or "displaying" or "recognizing" or "generating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Method and System for Labeling Data in a Communications System

Figure 1A:
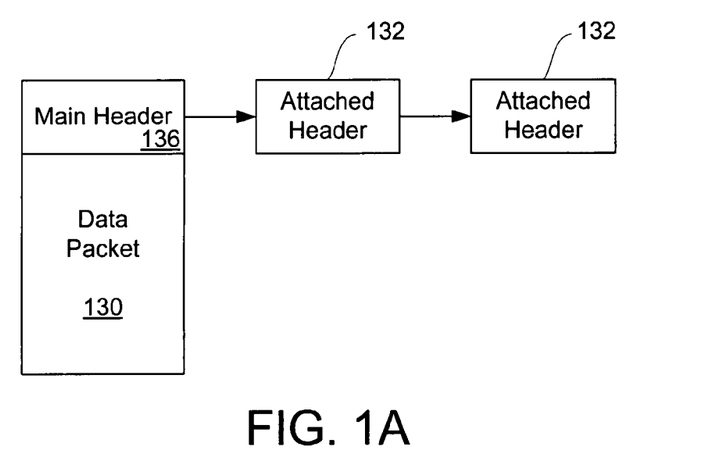
FIG. 1A is a diagram illustrating labeling data with headers attached to a data packet, according to embodiments of the present invention.

Embodiments of the present invention provide for a method and system of labeling data, such that attributes associated with the data may be transferred with the data. Referring now to FIG. 1A, when a data packet 130 is to be transferred between two nodes, the originating node may label the data packet 130 by constructing one or more headers containing selected attributes. The header may be, for example, an attached header 132. In one embodiment, the attached header 132 is an Internet Protocol Version 6 (IPv6) extension header. This may be a hop-by-hop extension header, which may include attributes useful when routing the data packet 130. The attached header 132 may also be an IPV6 destination extension header, which may include attributes useful for processing at a destination node. However, the present invention is not limited to these specific extension headers. Furthermore, the present invention is not limited to IPv6 extension headers. More generally, the headers containing the labels may be any header that is attached to a main or primary header 136. The attached header or headers 132 are attached to a main header 136 for the data packet 130 and then the data packet 130 and headers 132, 136 are delivered to either a routing or a destination node.

Figure 1B:
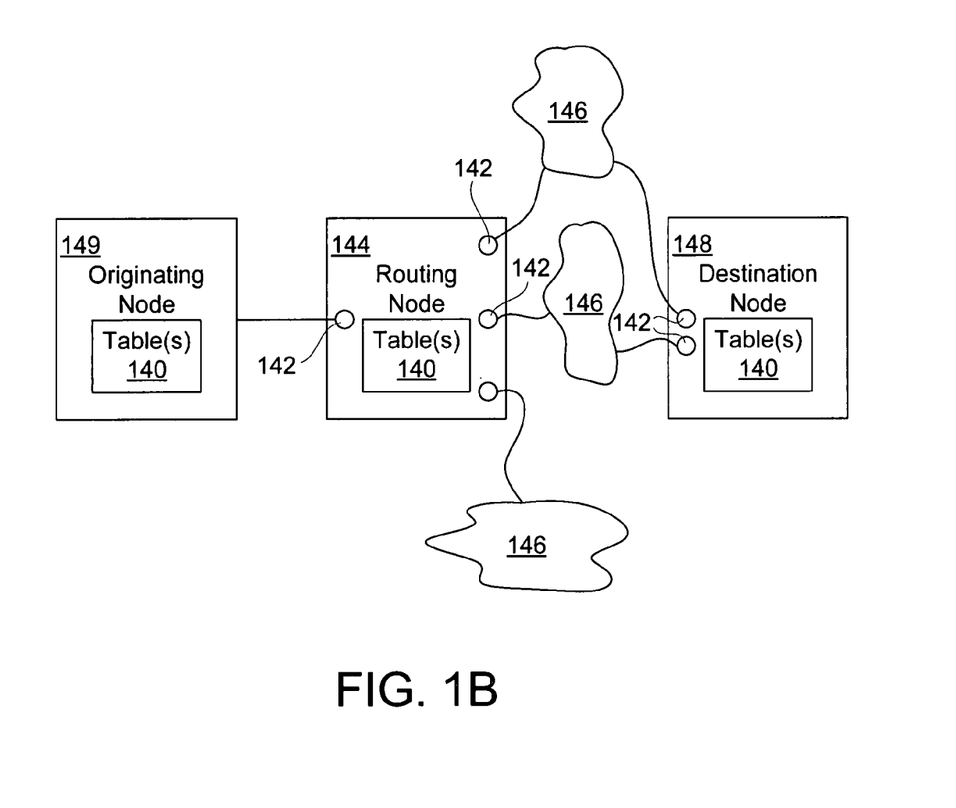
FIG. 1B is a diagram illustrating a network of nodes having tables for processing labeled packets, according to embodiments of the present invention.

The various nodes involved may agree upon one or more sets of constraints or rules for processing the data packet 130, based on values in the attached header fields. Referring now to FIG. 1B, the rules may be stored on the nodes in constraint tables 140, of which there may be one per interface 142. If a routing or intermediate node 144 receives a data packet 130 that came from an originating node 149, it may perform an incoming accreditation check to validate that it was proper to receive the data packet 130 on the particular interface 142 on which it arrived. The accreditation check may be based upon values in a hop-by-hop extension header. The routing node 144 may also compare values in a hop-by-hop extension header with a constraint table 140 containing the rules. In this fashion, the data packet 130 may be forwarded into one of the networks 146 based on attributes associated with the data packet 130 that are passed with the data packet 130.

When the data packet 130 arrives at the destination node 148, the destination node 148 may perform an incoming accreditation check to validate that it was proper to receive the data packet 130 on the particular interface 142 on which it arrived. The destination node 148 may perform this check by comparing values in a destination extension header with a set of rules for processing the data packet 130. The destination node 148 may then deliver the data packet 130 (or a portion thereof) to a process or client on the destination node 148 provided that the data attributes comply with the a set of rules for receiving the data packet 130. Different sets of rules may are used along the way, for example, each interface 142 may have a different set of rules.

When a data packet 130 is to be transferred from an originating node 149, an embodiment of the present invention constructs an attached header 132 having a label for the data attributes. The diagram of FIG. 2 and the computer-implemented process 300 of flowchart of FIG. 3 describe an embodiment of the present invention. Steps of process 300 may be stored as instructions on a computer readable medium and executed on a general-purpose processor. Steps of process 300 may be performed in another order than described in the flowchart. In step 310, a message is received at a transport layer 150 of the originating node. The message may contain a data packet 130 or other portion of data. The transport layer 150 may use the Transmission Control Protocol (TCP), the User Datagram Protocol (UDP), or other protocols that may be suitable for a transport layer 150.

Figure 2:
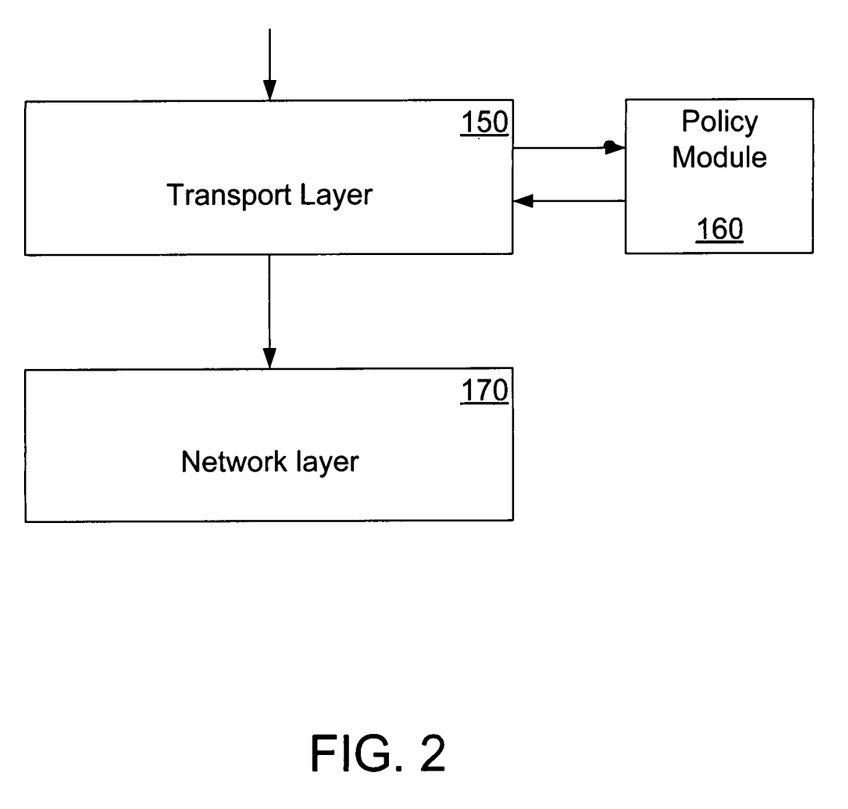
FIG. 2 is a diagram illustrating the flow of outbound traffic, according to embodiments of the present invention.

The data packet 130 has associated with it certain attributes, for example, security attributes. In one implementation, the message contains not only the data, but also data attributes. However, the data attributes may not be a part of the data packet 130 itself. Furthermore, it is not required that the message include the data attributes, as they may be determined implicitly. For example, within the originating node 149, the attributes may be discerned by examining file systems, device and process files, etc. However, the data attributes are not generally known by other nodes coupled to the originating node 149. By attaching a label to the data, other nodes are able to retrieve the data attributes and thus know, for example, the credentials of a remote process and the attributes of data. Thus, remote devices/systems may, for example, enforce access control rules.

In step 320, the policy module 160 may perform an export accreditation check, based on the attributes of the data. For example, the policy module 160 may determine if it is acceptable to send the data out a given interface 142 and, if not, to either find an acceptable interface 142 or drop the data packet 130. The policy module 160 may perform a variety of tasks that are related to policy rules. The present invention is not limited to performing the accreditation check in a policy module 160. In the event the data packet 130 is dropped, an appropriate message may be delivered to the process that requested the data transfer.

In step 330, the originating node 149 determines whether the data packet 130 should be labeled. This determination may be based on a number of factors, for example, the characteristics of the destination node 148, such as its security family. However, this example is not intended to limit the determination in this fashion. In one implementation the data is passed to a policy module 160, which determines if a label is needed.

If a label is needed, a label is constructed using the data attributes, in step 340. This label may be constructed by the policy module 160. However, this is not limiting, the label may be constructed by any suitable module. Then the policy module 160 may pass the label a transport module (not shown) with instructions to add an attached header 132 with the provided label. Communication between the policy module 160 and the transport module may be performed by an IPv6 advanced option of the socket API (Application Program Interface), which specifies a programming interface to send ancillary data. The policy module 160 may invoke the kernel side of that API.

In step 350, the attached header 132 (e.g., an IPv6 extension header) is constructed at the transport layer 150. In the case the transport layer 150 is using UDP, everything may happen as if the data were sent using the IPv6 advanced API version of sendmsg( ) with a control message containing a hop-by-hop and/or a destination header, except that the consistency and permission checking may be skipped, because the control message is generated by the kernel.

In the event the transport layer 150 is using TCP, however, labeling cannot be performed immediately when the messages are received by the transport layer 150 from upstream. Rather, labeling is delayed until the moment the messages are about to be forwarded to the Internet Protocol (e.g., to the network layer 170). This is because ancillary data can be sent only using per-endpoint options per-connection and not on a per-packet 130 basis. Furthermore, TCP transmits data packets 130 that are dissociated from a user's sending system call, like retransmissions, resuming of transmission after window sliding, and control packets.

Process 300 may build additional labels and construct additional attached headers 132 and add those attached headers 132 to the data packet 130. It may be that the data packet 130 has a main header 136 that identifies a first attached header 132, which in turn, identifies a second attached header 132. For example, one type of header 132 may be intended for routing nodes 144 and another type for a destination node. Whether using TCP, UDP, or another protocol, after the attached header 132 is constructed with the label, the portion of data is sent out the interface 142 of the originating node 149 with the constructed attached header(s) 132, in step 360. Process 300 then ends.

Figure 4:
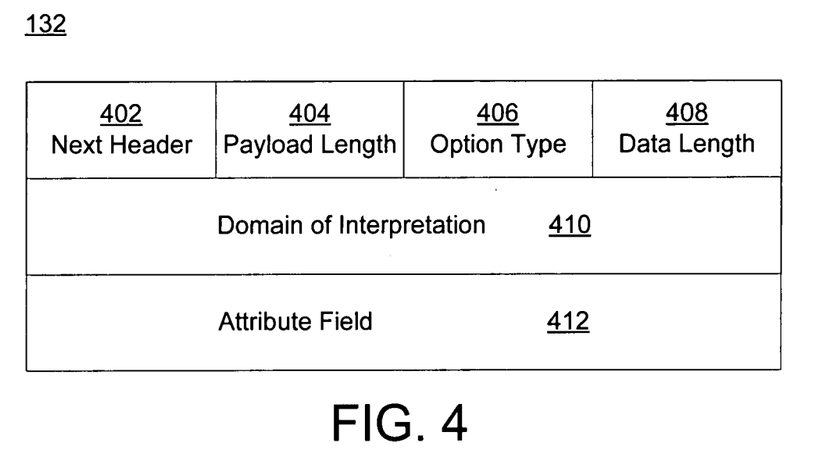
FIG. 4 is a diagram illustrating a general format for a header extension for labeling data, according to embodiments of the present invention.

FIG. 4 illustrates a general format for an attached header 132 that is suitable for delivering the data attributes. In one embodiment, the attached header 132 is an Internet Protocol Version 6 (IPv6) extension header. However, the present invention is not limited to IPv6. The next header field 402 is for specifying the next attached header 132, if there is one. The payload length field 404 may specify the length of the attached header 132 in units of 32-bit words, minus two. The option field 406 may specify that this attached header 132 contains data attributes or a label. The first two most significant bits (MSB) may be "00" to indicate that non-supporting nodes are to skip over this option and continue processing the data packet 130. The next MSB may be "0" to indicate that the option data does not change en-route. The remaining five bits of the option type field 406 may be a unique value, which may identify this attached header 132 as containing data attributes.

Continuing on with the attached-header 132 structure of FIG. 4, the domain of interpretation (DOI) field 410 may be a four-octet integer that identifies the semantics of the attribute field 412. For example, communicating nodes may agree on a number of sets of rules to be applied to the data attributes. The DOI field 410 may be used to identify which of the sets should be used for the data packet 130 with this attached header 132. Finally, the attached header 132 may contain an attribute field 412, which contains one or more tags describing the data attributes.

Figure 5:
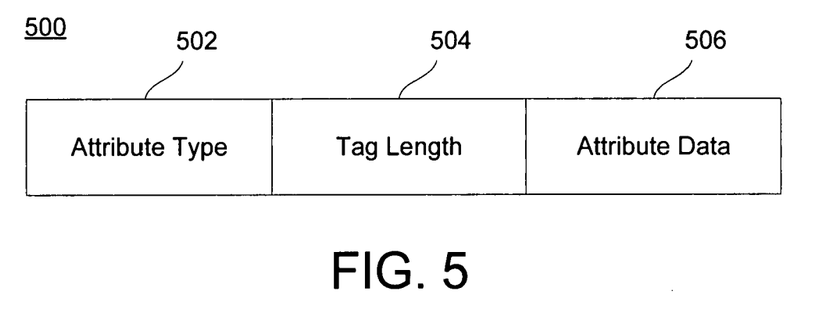
FIG. 5 is a diagram illustrating a format for option data, according to embodiments of the present invention.

Referring now to FIG. 5, an exemplary tag 500 is illustrated. There may be any number of tags 500 in the attribute field 412. The first field in the tag 500 is a attribute type 502, which identifies the type of information in the attribute data field 506. For example, the type of information may relate to sensitivity, clearance, privileges, etc. The tag length 504 specifies the total length of the tag 500, and may be expressed in octets.

The following attribute types 502 are described to provide examples of the type of data attributes that may be transferred in the attached header 132. However, the attribute types 502 are by no means limited to the examples presented in Table 1.

TABLE 1

Attribute Type 1: The attribute may be a hierarchical two-octet entity. Tag length 504 may equal four. This may be a level or classification. The comparison of fields of this may be conventional mathematical relations.
Attribute Type 2: Non-hierarchical bit-vector. Tag length 504 may be a variable number of octets. This type may be used for categories/compartments bit sets. The comparison of fields of this type may be the inclusion relation.
Attribute Type 3: Enumeration. Tag length 504 may be a variable number of octets. This may be a list of items. Each item may be a short integer. Each item may be a compact way of coding categories and compartments. The comparison of fields of this type may be the inclusion relation.
Attribute Type 4: List of ranges. Tag length 504 may be a variable number of octets. Each range may have two shorts: lower and upper boudaries of the interval. The ranges may be intended as an efficient grouping of categories and compartments. The comparison of fields of this type may be the inclusion relation.
Attribute Type 5: Destination-only data. Tag length 504 may be a variable number of octets. Only the destination nodes 148 that understand the DOI 410 may be able to interpret it. This option may not be understood by router nodes 144 when present in a hop-by-hop header and may thus be skipped.

It may be that the data attributes that the originating node 149 wishes a destination node 148 to use are different from the data attributes that the originating node 149 wishes an intermediate or routing node 144 to use. For example, Attribute Type 5 may be intended only for destination nodes 148. Also, it may be that a tag 500 that is suitable for both destination 148 and routing nodes 144 is to only be used by one of them. Thus, the originating nodes 149 may construct a second attached header 132. In this fashion, one attached header 132 (e.g., a destination extension header) may be for a destination node 148, while another attached header 132 (e.g., a hop-by-hop extension header) may be for routing nodes 144.

Referring now to the flowchart of FIG. 6, a process 600 in which a node receives a data packet 130 is illustrated. Steps of process 600 may be stored as instructions on a computer readable medium and executed on a general-purpose processor. Steps of process 600 may be performed in another order than described in the flowchart. The node may be either a destination node 148 or a routing node 144; however, some details may differ depending on the type of node. For example, a router 144 may forward the data packet 130 to another node while the destination node 148 may deliver the data packet 130 to a process within the destination node 148. In step 610, the node receives a data portion or packet 130 via some interface.

In step 620, the node determines if the option type 406 specifies that an attached header 132 contains data attributes. A routing node 144 may look at a hop-by-hop extension header, while a destination node 148 may look at a destination extension header. If the data packet 130 does not contain the option type 406 indicating that data attributes are in the attached header 132, then the process 600 ends. Otherwise, step 630 is taken.

In step 630, the node performs an incoming accreditation check to determine if the data packet 130 is allowed to be received into the interface 142 on which is was delivered. This check is based on data attributes in the label in the appropriate attached header 132, and the constraint table 140 for the receiving interface 142.

If the accreditation check fails, the node may send a message, for example an Internet Control Message Protocol (ICMP) message, in step 640.

If the accreditation check passes, then step 650 may be performed. If this a routing node 144, the node determines on which interface 142 to route the data packet 130. If this is a destination node 148, then the node determines how to deliver the data packet 130 within the node. For example, the destination node 148 may determine if a process is allowed to have the data packet 130. This may be performed by comparing values in the attached header 132 with values in a constraint table 140 stored on the node.

Figure 7:
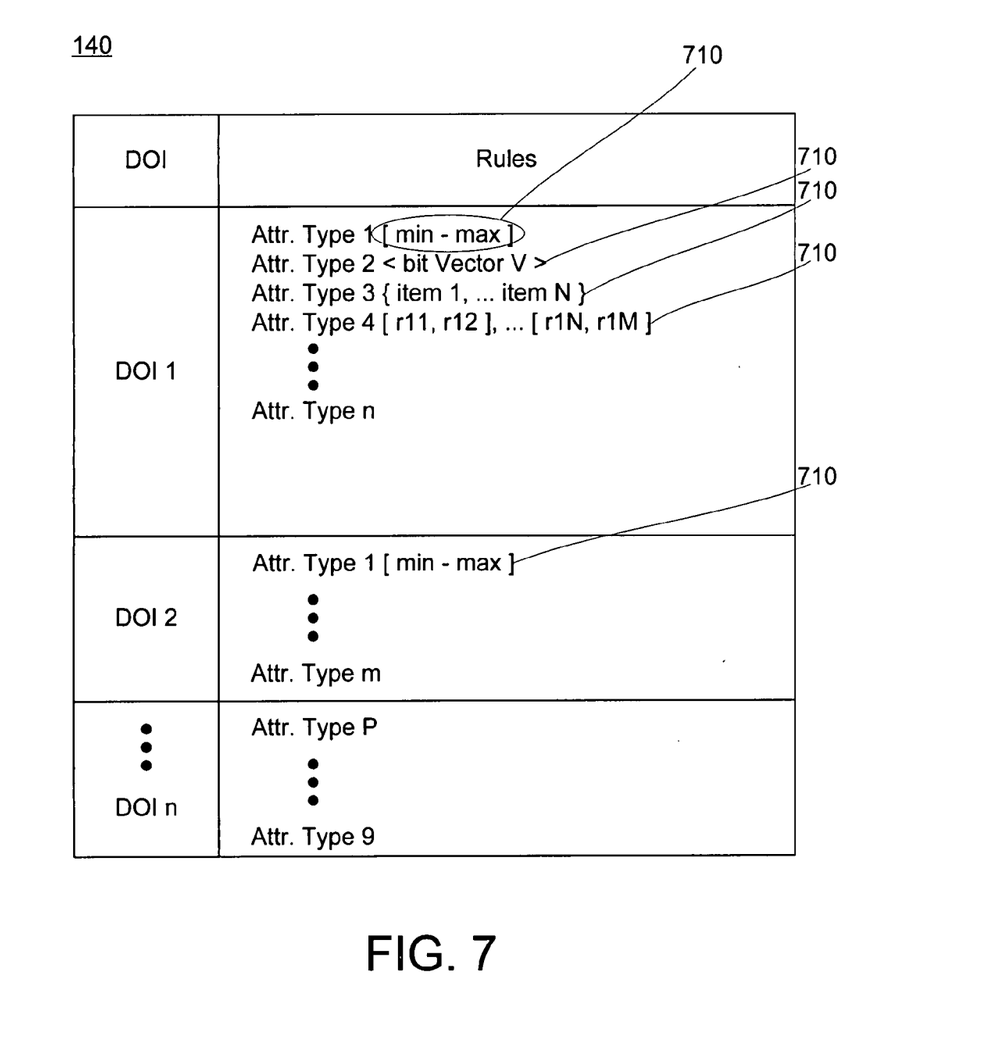
FIG. 7 is an exemplary interface protection table, according to embodiments of the present invention.

FIG. 7 illustrates an exemplary constraint table 140 that may be used for the determination in steps 630 or 650 of process 600. Each node may have a constraint table 140 for each interface 142. However, a node may have fewer constraint tables 140 than interfaces 142. A number of domains of interpretation (DOIs) may be specified for each interface 142. For example, two organizations may agree upon the set of rules that are to be used for each DOI for each interface 142. The constraint tables 140 may then be loaded onto the nodes in any suitable manner. In this fashion, a different rule 710 may be applied to the same attribute type 502 while processing a data packet 130 at the same interface 142. Thus, the constraint table 140 shows DOIs 1 through n. For example, for attribute type 1, the rule 710 is that the value of the attribute type 502 (as specified in the attribute data field 506) must be between the minimum and maximum value specified in the rule 710.

A data packet 130 may be admitted through an interface 142 if its attribute data 506 comply with the rules 710 defined on that interface 142 for the label's DOI. If the node does not recognize the DOI of the data packet 130 then it may be discarded. For the exemplary attribute types described herein, passing a rule 710 may mean the information as presented in Table 2.

TABLE 2

Attribute Type 1: The attribute data 506 value is within the range in the rule 710.
Attribute Type 2: All the bits set in the attribute data 506 are set in the bit vector of the rule 710.
Attribute Type 3: All the items enumerated in the attribute data 506 belong to either an Attribute Type 3 or an Attribute Type 4 on the interface 142.
Attribute Type 4: All the items in the ranges enumerated in the attribute data 506 belong to either an Attribute Type 3 or an Attribute Type 4 on the interface 142.

FIG. 8 illustrates a process 800, which uses a constraint table 140 when processing data packets 130. Steps of process 800 may be stored as instructions on a computer readable medium and executed on a general-purpose processor. Steps of process 800 may be performed in another order than described in the flowchart. In step 810, the domain of interpretation field 410 in the attached header 132 is used to determine which set of rules 710 to apply. For example, if the DOI is "2", then the second row of rules 710 in the constraint table 140 of FIG. 7 may be used.

In step 820, the attribute type 502 in the attached header 132 is used to determine which rule 710 to apply. For example, referring to FIG. 7 and assuming that the DOI is "DOI 1", if the attribute type 502 specifies that it is "attribute type 3," then the rule 710 is to determine if the attribute data 506 is within the list of items in the set.

In step 830, the rule 710 is applied to the value in the attribute data 506 field. If there are more constraints to process, the process 800 returns to step 820. The process 800 repeats until all constraints in this DOI are processed.

Figure 9:
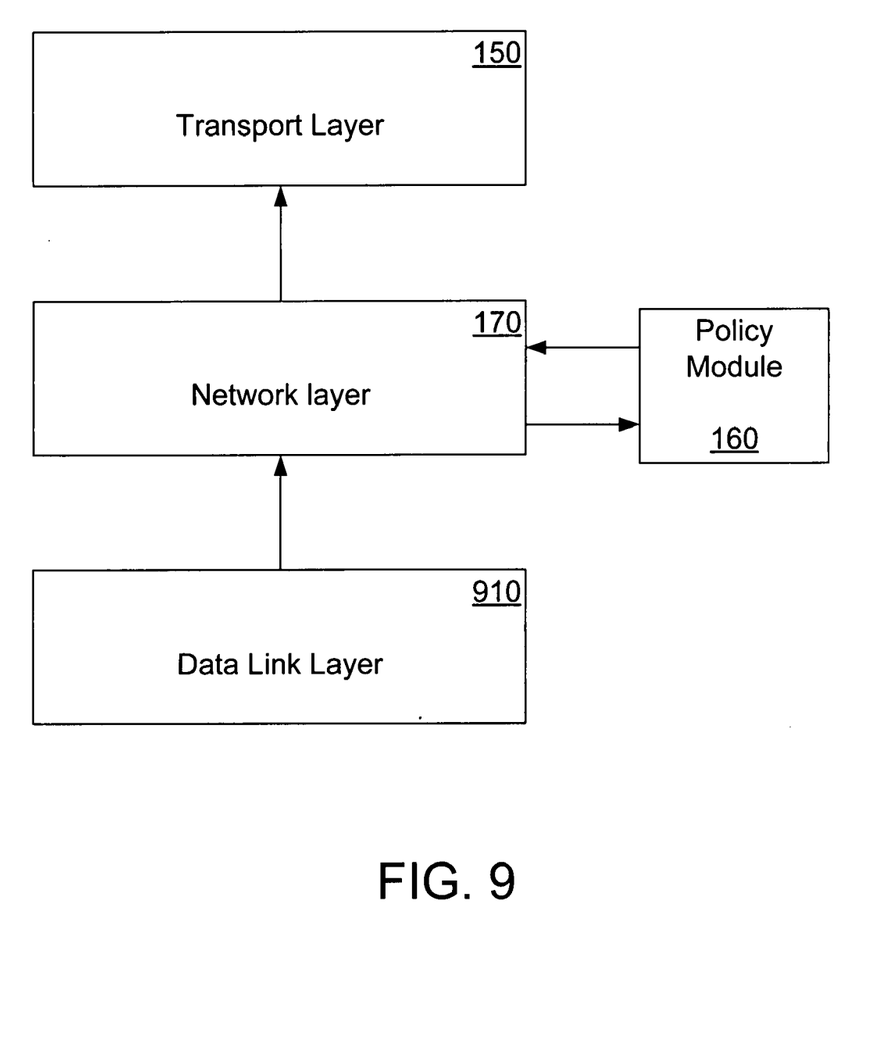
FIG. 9 is a diagram illustrating flow of inbound traffic, according to embodiments of the present invention.

Referring now to FIG. 9, an inbound traffic flow at a destination node 148 will be described. A message arrives at the network layer 170 from the data link layer 910. The policy module 160 may then reconstitute the data attributes of the incoming data packet 130 using the same template used by the originating node 149. If the incoming accreditation check passes, the data packet 130 is kept to be delivered. The message may then be delivered to the correct IP client.

Figure 10:
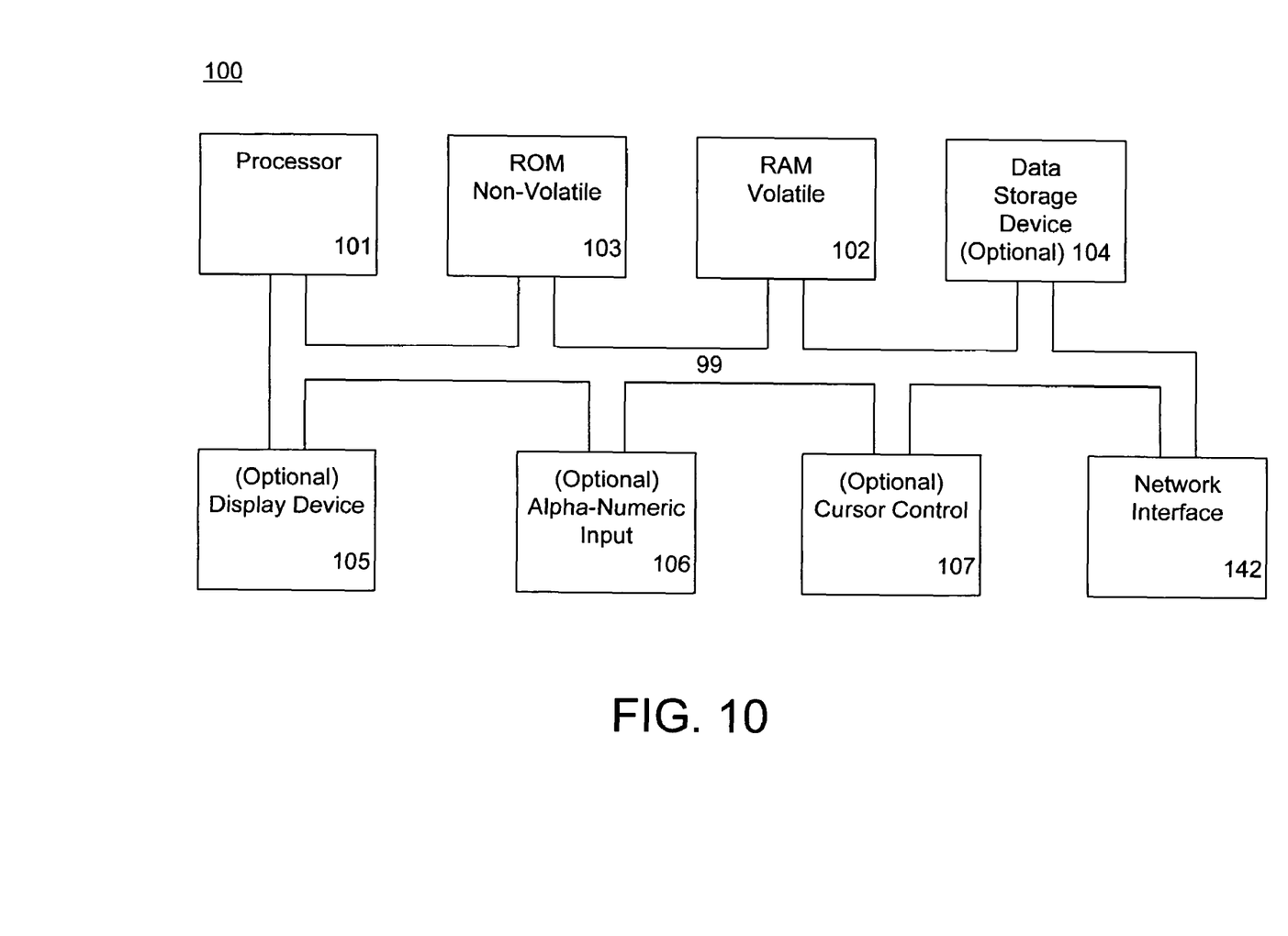
FIG. 10 is a computer system that may serve as a platform for embodiments of the present invention.

FIG. 10 illustrates circuitry of computer system 100, which may form a platform for embodiments of the present invention. Computer system 100 includes an address/data bus 99 for communicating information, a central processor 101 coupled with the bus 99 for processing information and instructions, a volatile memory 102 (e.g., random access memory RAM) coupled with the bus 99 for storing information and instructions for the central processor 101 and a non-volatile memory 103 (e.g., read only memory ROM) coupled with the bus 99 for storing static information and instructions for the processor 101. Computer system 100 also includes an optional data storage device 104 (e.g., a magnetic or optical disk and disk drive) coupled with the bus 99 for storing information and instructions.

With reference still to FIG. 10, system 100 of the present invention also includes an optional alphanumeric input device 106 including alphanumeric and function keys is coupled to bus 99 for communicating information and command selections to central processor unit 101. System 100 also optionally includes a cursor control device 107 coupled to bus 99 for communicating user input information and command selections to central processor unit 101. System 100 of the present embodiment also includes an optional display device 105 coupled to bus 99 for displaying information. A network interface 142 coupled to bus 99 provides communication with external devices.

The preferred embodiment of the present invention a method for labeling data, is thus described. While the present invention has been described in particular embodiments, it should be appreciated that the present invention should not be construed as limited by such embodiments, but rather construed according to the below claims.

What is claimed is:

1. A method of labeling data, comprising:
   a) determining if a label is to be added to a portion of data having an associated first header;
   b) constructing a second header comprising said label, wherein said label comprises at least one attribute of said data;
   c) attaching said second header to said portion of data; and
   d) transmitting said portion of data along with said first and said second headers;
   wherein said second header comprises a field for containing a value that specifies which set of rules are to be applied when processing said portion of data and said second header comprises an attribute type that is to be tested by applying a given rule in said set of rules.

2. The method of claim 1, wherein said second header comprises a field for containing a value that indicates that said second header comprises said label.

3. The method of claim 1, wherein said second header further comprises a value for said attribute type.

4. The method of claim 1, wherein said second header comprises:
   a field for containing a value that indicates that said second header comprises said label; and a field for containing a value that specifies which set of rules is to be applied when processing said portion of data.

5. The method of claim 4, wherein said second header further comprises:
an attribute type that is to be tested by applying a given rule in said set of rules; and a value for said attribute type.

6. The method of claim 1, further comprising:
   e) receiving said portion of data via an interface of a node; and
   f) based on said label, performing an accreditation check to determine if said portion of data is allowed to be received via said interface.

7. The method of claim 1, further comprising:
   e) receiving said portion of data at a destination node; and
   f) determining a manner in which said portion of data is to be delivered within said destination node, based on said label.

8. The method of claim 1, further comprising:
   e) an intermediate node receiving said portion of data; and
   f) said intermediate node routing said portion of data based on said label.

9. The method of claim 1, further comprising:
   constructing a third header comprising further attributes associated with said portion of data; and attaching said third header to said portion of data.

10. The method of claim 9, further comprising:
    an intermediate node receiving said portion of data; and said intermediate node processing said portion of data based on said further attributes in said third header.

11. The method of claim 10, further comprising:
    a destination node receiving said portion of data; and said destination node processing said portion of data based on said attributes in said second header.

12. A method of transferring attributes associated with a packet of data, comprising:
    a) receiving, at a transport layer of a node, a packet having attributes associated therewith;
    b) determining if said packet is to have a label comprising at least one of said attributes;
    c) constructing an Internet Protocol Version 6 (IPv6) extension header comprising said label for said packet;
    d) adding said extension header to said packet; and
    e) transferring said packet over an interface of said node;
    wherein said c) comprises c1) for constructing said extension header with a value in an option type field specifying that said extension header carries attributes associated with said packet and c2) for constructing said extension header with a field for specifying a set of rules that are to be used to process said attributes.

13. The method of claim 12, wherein said c) further comprises:
    c3) constructing said extension header with a field for specifying an attribute type and a field for specifying a value for said attribute type.

14. The method of claim 12, further comprising:
    f) determining a manner in which said packet is to be delivered within a destination node, based on said label.

15. The method of claim 12, wherein said Internet Protocol Version 6 (IPv6) extension header is a destination extension header.

16. The method of claim 15, further comprising: constructing a hop-by-hop header with further attributes associated with said packet of data; and adding said hop-by-hop header to said packet.

17. The method of claim 16, further comprising:
    an intermediate node receiving said packet; and said intermediate node routing said packet based on said further attributes in said hop-by-hop header.

18. A computer readable medium having stored thereon instructions which, when executed on a processor of a computer system, implement a method of processing packets, comprising:
- a) receiving, on a first interface of a node, a packet having an Internet Protocol Version 6 (IPv6) hop-by-hop header;
- b) performing an incoming accreditation check by comparing values in said hop-by-hop header with values in a table for said first interface; and
- c) routing said packet based on said values in said hop-by-hop header;
- wherein said b) of said method comprises b1) for comparing a value of an attribute type in said hop-by-hop header with a rule for interpreting said attribute type in a table for said first interface.

19. The computer readable medium of claim 18, wherein said c) of said method comprises:
- c1) determining if a second interface is a valid route for said packet by comparing values in said hop-by-hop header with values in a table for said second interface; and
- c2) if said second interface is valid, sending said packet out said second interface.

20. The computer readable medium of claim 19, wherein said c) of said method further comprises:
- c3) if said second interface is invalid, determining if a third interface is a valid route for said packet by comparing values in said hop-by-hop header with values in a table for said third interface; and
- c4) if said third interface is valid, sending said packet out said third interface.

21. The computer readable medium of claim 18, wherein:
said hop-by-hop header comprises a domain of interpretation, an attribute type, and a value for said attribute type; and wherein said c) of said method comprises:
- c1) based on said domain of interpretation, selecting a row in a table;
- c2) comparing said value of said attribute type with a rule for said attribute type in said row; and
- c3) repeating said c2) for additional attribute types in said hop-by-hop header, if any.

22. In a computer system, a computer readable medium having stored thereon instructions which, when executed on a processor of said computer system, implement a method of labeling a packet, comprising:
- a) receiving, at a transport layer of a node, a packet having attributes associated therewith;
- b) determining if said packet is to have a label for at least one of said attributes;
- c) appending an Internet Protocol Version 6 (IPv6) extension header comprising said label to said packet, at said transport layer; and
- d) transferring said packet to a network layer of said node.

23. The computer readable medium of claim 22, wherein said method further comprises:
before transferring said packet to said network layer, selecting a route based on at least one of said attributes by examining a table of constraints for an interface and determining if said interface on which said packet is to be sent is allowable for said interface.

24. The computer readable medium of claim 22, wherein said c) of said method further comprises:
- c1) adding to said Internet Protocol Version 6 (IPv6) extension header a domain of interpretation for specifying a set of rules that are to be used to process attributes in said label.

25. The computer readable medium of claim 24, wherein said c) of said method further comprises:
- c2) adding to said Internet Protocol Version 6 (IPv6) extension header an attribute type identifier for specifying which attribute type is to be referenced when processing said label.

26. The computer readable medium of claim 25, wherein said c) of said method further comprises: c3) adding to said Internet Protocol Version 6 (IPv6) extension header a value for said specified attribute type.

27. The computer readable medium of claim 26, wherein said c) of said method further comprises:
- c4) constructing said Internet Protocol Version 6 (IPv6) extension header with a value in an option type field specifying that said header carries attributes.

* * * * *